(12) United States Patent
Spaggiari

(10) Patent No.: US 6,192,959 B1
(45) Date of Patent: Feb. 27, 2001

(54) MACHINE FOR FITTING AND REMOVING TIRES

(75) Inventor: Rino Spaggiari, Correggio (IT)

(73) Assignee: G.S. S.r.l., Correggio (IT)

( * ) Notice: Subject to any disclaimer, the term of this patent is extended or adjusted under 35 U.S.C. 154(b) by 0 days.

(21) Appl. No.: 09/427,674

(22) Filed: Oct. 27, 1999

(30) Foreign Application Priority Data

Nov. 6, 1998 (IT) .............................................. MO98A0232

(51) Int. Cl.⁷ .............................................. B60C 25/132
(52) U.S. Cl. .............................................. 157/1.28
(58) Field of Search ................ 157/1.28, 1.26, 157/1.3, 1.17

(56) References Cited

U.S. PATENT DOCUMENTS

| 2,344,704 | * | 3/1944 | Krantz | 157/1.17 |
| 2,798,540 | * | 7/1957 | Branick | 157/1.26 |
| 2,837,147 | * | 6/1958 | Henderson et al. | 157/1.28 |
| 4,047,553 | * | 9/1977 | Kotila | 157/1.24 |
| 4,768,572 | * | 9/1988 | Newburgh | 157/1.26 |
| 5,215,138 | * | 6/1993 | Toriselli et al. | 157/1.17 |
| 5,222,538 | * | 6/1993 | Tomita et al. | 157/1 |
| 5,226,465 | * | 7/1993 | Schon et al. | 157/1.28 |
| 5,381,843 | * | 1/1995 | Corghi | 157/1.28 |
| 5,758,703 | * | 6/1998 | Mimura | 157/1.28 |

* cited by examiner

Primary Examiner—David A. Scherbel
Assistant Examiner—David B. Thomas
(74) Attorney, Agent, or Firm—Browdy and Neimark

(57) ABSTRACT

The machine for dismounting and fitting tires comprises a chuck which is rotatable about a rotation axis, on which a motor vehicle wheel can be fitted. Two arms are mounted either side of the chuck, the arms being hinged about two pivots superiorly bearing two tools able, by effect of rotations of the arms in both directions about the pivots, to move along at least one transversal plane to a wheel mounted on a chuck. Each tool is destined to operate contactingly with a bead of the tire. The arms are connected one to another by a length-adjustable con rod, hinged to the arms.

9 Claims, 3 Drawing Sheets

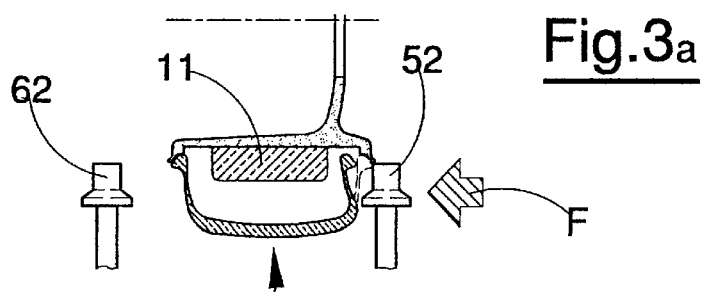
Fig.3a
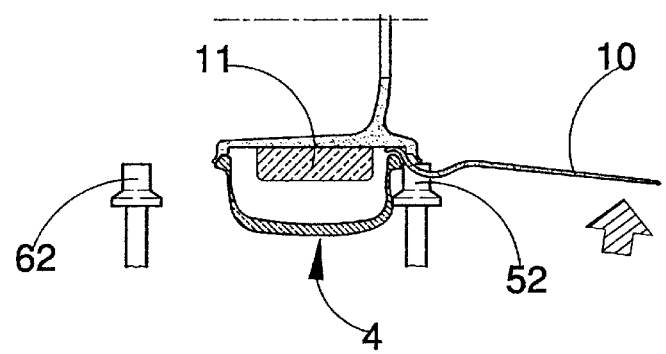
Fig.3b
Fig.3c
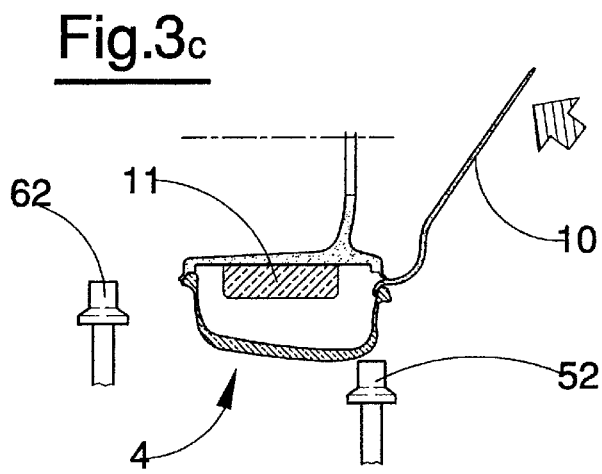
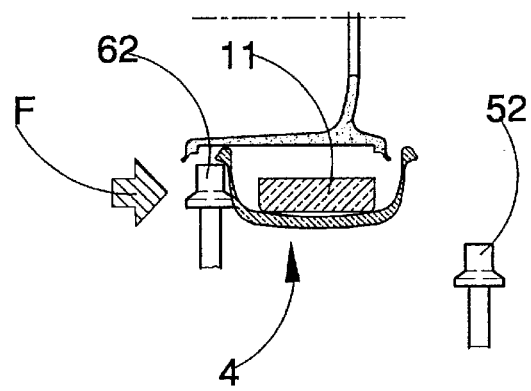
Fig.3d
Fig.3e
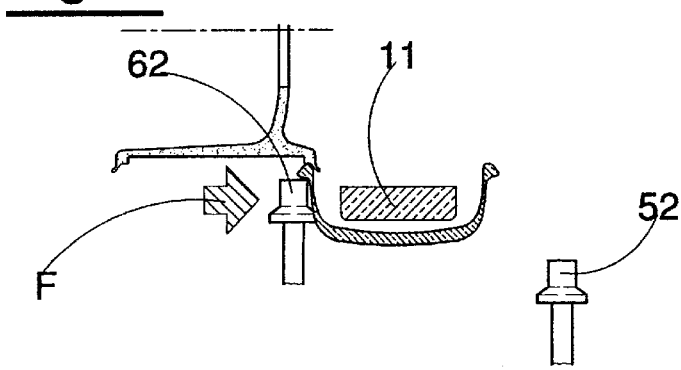

MACHINE FOR FITTING AND REMOVING TIRES

BACKGROUND OF THE INVENTION.

The prior art comprises Italian patent IT 1.246.168, which teaches a machine for fitting and removing tires which includes a self-centering platform, rotatable about a horizontal axis, and a tool-bearing tubular arm having an axis located, when in the work position, in a more or less perpendicular direction to an axis of rotation of the platform. At its base the arm is hinged and can slide axially along a parallel direction to the rotation axis of the platform. The arm bears, coaxially, at its upper part, a tool-bearing shaft on which two tools are arranged. The shaft is rotatable about its own longitudinal axis, enabling a single tool to be placed in the working position. The arm can act on both sides of the tire belonging to the wheel placed on the self-centering platform, thanks to the freedom to rotate the tools predisposed on the end of the tool-bearing arm by 180°. By performing this rotation the tools can be switched to operate on the opposite side of the tire. The tool-bearing arm is made so that when the arm is moved about the axis to which it is inferiorly hinged, the tool housed there is repositioned. The total operations needed for fitting and removing a tire using the above-described prior-art machine are relatively long and laborious.

SUMMARY OF THE INVENTION.

The main aim of the present invention is to provide a machine with which it is possible to perform tire removal and fitting extremely quickly and easily. An advantage of the invention is that it provides a machine that can perform its designated function for a relatively long time without need of repair, with no interruptions in the work cycle or other operational irregularities.

A further advantage is its simplicity of use.

A still further advantage is that a machine is provided which can be actuated by means of a single actuator and a single command.

A still further advantage is that the machine can, relatively effortlessly, make sure the beads of the tires are properly lodged and settled in the bead housings in the rim during the fitting stage.

BRIEF DESCRIPTION OF THE DRAWINGS.

Further characteristics and advantages of the present invention will better emerge from the detailed description that follows of a preferred but non-exclusive embodiment of the invention, illustrated purely by way of a non-limiting example in the accompanying figures of the drawings, in which:

FIGS. 3a to 3e schematically show five operative phases of the machine.

Figure 1:
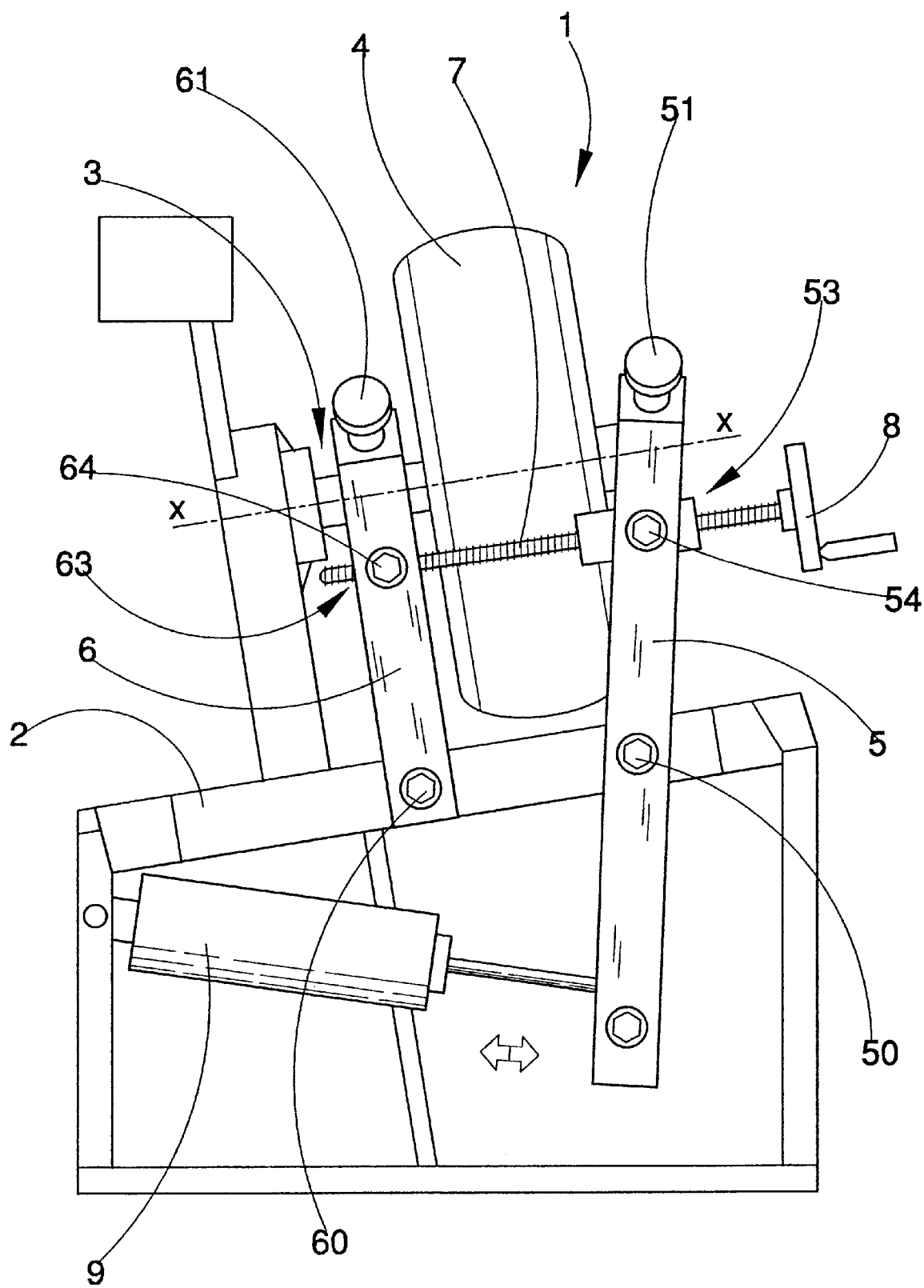
FIG. 1 is a schematic lateral view in vertical elevation of a machine made according to the invention.
Figure 2:
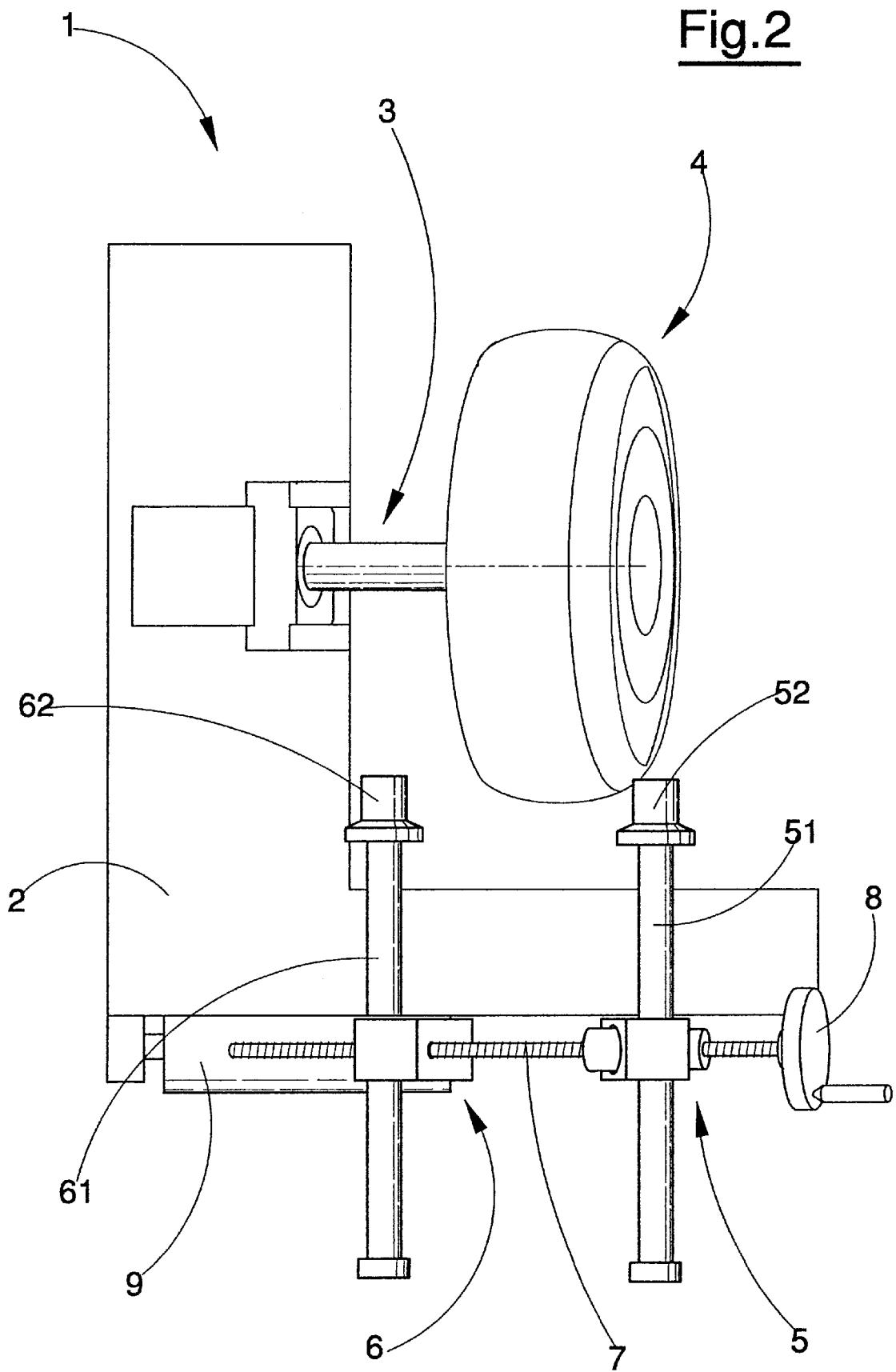
FIG. 2 is a plan view from above of the machine of FIG. 1.

DESCRIPTION OF THE PREFERRED EMBODIMENTS.

With reference to the above-mentioned figures of the drawings, 1 denotes in its entirety a machine for removing and fitting tires on motor vehicle wheels, which comprises a chuck 3, applied on a frame 2, which chuck 3 is rotatable about a rotation axis x—x. The chuck 3 is equipped with the usual jaws for coaxially gripping the rim of a wheel of a motor vehicle. A rim of a wheel 4 provided with a tire can be positioned on the chuck 3.

The rim of the wheel 4 is provided with two circular edges which exhibit seatings in which the two beads of the tires can be lodged. Specifically though not exclusively, the machine 1 can be advantageously used for wheels having a plastic annular body 11 situated between the rim and the tire, the purpose of which is to protect the rim in case of puncture. In order that the protective annular body 11 can be introduced and extracted, the wheel 4 has a tire which is provided with two beads having different diameters, one slightly larger than the other, which are coupled with two seatings predisposed on the rim which seatings also have slightly different diameters. The internal diameter of the annular body 11 is comprised between the two diameters, bigger and smaller, of the rim seatings, so that the body 11 can be introduced and removed from the side of the rim having the smaller diameter.

The machine 1 is equipped with two arms 5 and 6 predisposed by the side of the chuck 3, which arms 5 and 6 are hinged to the frame 2 about two pivots 50 and 60 having rotation axes which are parallel to each other and perpendicular to the direction of axis x—x of the chuck 3. The pivots 50 and 60 are arranged below the chuck 3. The arms 5 and 6 are arranged on a same vertical lie plane, parallel to the axis x—x of the chuck 3 and normal to the axes of the pivots 50 and 60, and are mobile along the lie plane.

A tool-bearing organ i.e. a tool-holder, 51 and 61 is constrained to each arm 5 and 6; a tool 52 and 62, is gripped by each tool-holder 51 and 61. The two tools 52 and 62 are located side-by-side. Each of them interacts contactingly with a respective tire bead. Each of the tools 52 and 62 can be displaced along at least one plane which is transverse to a wheel 4 mounted on the chuck 3, by effect of the rotations of the arm 5 or 6 in both directions about its pivot 50 or 60.

Each tool-holder 51 and 61 comprises a bar slidably coupled on the upper end of an arm 5 or 6. The sliding of the bar can take place along the longitudinal axis of the bar itself. The bars are parallel and perpendicular to the longitudinal axis of the arm 5 or 6 to which they are slidably constrained. The bars are also perpendicular to the axis x—x of the chuck 3.

The arms 5 and 6 are mechanically connected to each other, preferably by means of a connecting rod 7 hinged to the arms themselves, giving rise to an articulated quadrilateral. The connecting rod 7 is coupled to two guides 53 and 63 hinged to the arms 5 and 6 about two articulation hinges, respectively 54 and 64. At least one of the two guides 63 is provided with a nut screw coupling with a threaded section of the connecting rod 7. The other guide 53 is rotatably coupled to the connecting rod 7, enabling the connecting rod 7 to freely rotate in both directions about its longitudinal axis, while not allowing sliding along the axis. An end of the connecting rod 7 exhibits a handwheel 8 for rotating the connecting rod 7 about its own longitudinal axis. Thanks to the screw coupling with the guide 63, these rotations produce rotations of the arm 6 about the lower pivot 60 (keeping the arm 5 steady) by effect of which rotations the length of the connecting rod 7 is changed, i.e. the distance between the two articulation pivots 54 and 64 which connect the guides 53 and 63 to the arms 5 and 6. This enables the tools 52 and 62 to be neared and distanced to and from each other. In particular, the tools 52 and 62 can be neared so that they act contemporaneously on the two beads during tire fitting. By effect of the reciprocal rotations in one direction between the nut screw of the guide 63 and the connecting rod 7, the two tools 52 and 62 can be neared so that the beads of the tire can be gripped between them. Rotations in the opposite direction cause the tools to distance one from the other and therefore to loosen their grip on the tire beads. The arms 5 and 6, the tools 52 and 62, the connecting rod 7, the guides 53 and 63 with the nut screw and the handwheel 8 together form a mechanism which could be described as a sort of clamp or vice, able to grip the tire beads so that they are forced to house properly inside the seatings during the tire fitting operation.

Each tool 52 and 62 comprises a roller having a peripheral surface that is destined to interact contactingly with the tire. The peripheral surface has two cylindrical end portions having different diameters, which are joined by an truncoconical intermediate portion. The larger-diameter cylindrical portion can be positioned towards the periphery of the wheel 4 mounted on the chuck 3, while the smaller-diameter portions is positionable towards the center of the wheel itself. The intermediate truncoconical portion of each tool 52 and 62 interacts with the external side of the tire bead to settle the bead in the housing during the tire fitting operation.

The machine 1 comprises two motors, connected to one only of the two arms, arm 5, for rotating both arms 5 and 6. The motors comprise a hydraulic cylinder 9 having a bottom hinged to the frame 2 and a stem hinged to an end of an arm 5.

The operations for removing a tire from a wheel 4 will now be described, making reference to FIGS. 3a to 3e of the drawings.

Firstly, a tool 52 pushes a zone of the bead internalwise of the wheel (FIG. 3a) so as to detach said zone of the bead from the rim. With the tool 52 acting thus on the abovementioned zone of the bead, the larger-diameter portion of roller operates in contact with the part of the tire wall which is closest to the tread, while the smaller-diameter portion operates in contact with the part of the tire wall closest to the rim.

The detachment of a zone of the bead from the rim allows an operator to insert one or more extractor tools 10 (see FIG. 3b) in between the bead and the rim. With these tools 10 the bead can be removed from the rim, towards the outside of the wheel 4. In order to extract the bead, the tool 52 is retracted by sliding the bar of the tool-holder 51 so that it does not interfere with the tire (see FIG. 3c).

Once a bead has been extracted, the other tool 62 is brought to operate on the other bead, by means of a small rotation of the arms 5 and 6 controlled by the cylinder 9. The tool 62 begins its action by pressing the bead internalwise of the wheel 4, thus detaching the bead itself from the edge of the rim (FIG. 3d). The bead is then pushed, still in the same direction as indicated by arrow F, so that the bead is finally brought outside of the rim on the opposite side (FIG. 3e), and the tire is effectively dismounted.

Mounting the tire is done as follows: the larger-diameter bead is inserted into the rim through the edge of the smaller-diameter rim; coupling of the smaller-diameter bead in the corresponding rim seating; extraction of the larger-diameter bead from the rim and subsequent coupling to the corresponding seating on the rim. The above-described operations can easily be carried out even by a relatively inexperienced operator and therefore need no further explanation.

It is, however, worthwhile dwelling briefly on the phase of settling-in of the beads in their seatings on the rim. This phase involves gripping the beads between the tools 52 and 62, using the handwheel 8, and thus rotating the chuck 3 in order for the tools to operate over the whole circumference of the beads. This ensures a correct and stable coupling between the rim and the beads. Experiments have shown that this settling-in phase of the beads in the seatings is easier and more effective thanks to the special shape of the peripheral surface of the rollers acting on the tire.

What is claimed is:

1. A machine for fitting and removing a tire with beads engaged on a rim of a motor vehicle wheel comprising:

a frame;

a chuck engaged on the frame for mounting the rim and tire;

two arms engaged by pivots to the frame, the arms arranged laterally to the chuck so that rotation axes of the arms are parallel and transverse to an axis of the chuck;

two bars engaged respectively on each of the two arms;

a tool engaged on a free end of each of the two bars;

means for rotating each of the arms in opposite directions about the pivots;

rotation of the arms being in a plane transverse to the rim and the tire to be mounted on the chuck;

wherein each tool is moveable to contact one of the beads of the tire.

2. The machine of claim 1, wherein the means for rotating the arms comprises the two arms which are connected to each other by means of a connecting rod, the connecting rod being hinged to each of the two arms and being length-adjustable.

3. The machine of claim 2, wherein the connecting rod is coupled to two guides, each of which is hinged to an arm of the two arms; the connecting rod being coupled to at least one of said two guides by means of a screw coupling; wherein reciprocal rotations between the at least one guide and the connecting rod causes the arms, and tool on each, to move apart or together.

4. The machine of claim 3, comprising a hydraulic cylinder having a stem which is hinged to an end of an arm of the two arms to rotate both arms together in either of opposite directions.

5. The machine of claim 4, wherein each tool comprises a rotatable roller having a peripheral surface which can contact the tire, and which has two coaxial cylindrical end portions having different diameters and being joined by a central truncoconical portion of the roller.

6. The machine of claim 5, wherein the cylindrical portion of the roller having a larger diameter can be positioned towards a periphery of the rim and tire mounted on the chuck; and wherein the cylindrical portion of roller having a smaller diameter can be positioned towards a center of the wheel mounted on the chuck.

7. The machine of claim 6, wherein the intermediate truncoconical portion of each roller interacts with an external side of the bead of the tire in order to settle the bead in a seating therefor, during a tire fitting operation.

8. The machine of claim 1, wherein each bar is axially slidably on an end of each of the two bars.

9. The machine of claim 8, wherein the two bars are arranged with parallel longitudinal axes.

* * * * *